US 11,734,023 B2

(12) United States Patent
Peled et al.

(10) Patent No.: US 11,734,023 B2
(45) Date of Patent: Aug. 22, 2023

(54) PRELOADING OF APPLICATIONS HAVING AN EXISTING TASK

(71) Applicant: TENSERA NETWORKS LTD., Hod Hasharon (IL)

(72) Inventors: Roee Peled, Ramat Gan (IL); Amit Wix, Raanana (IL)

(73) Assignee: TENSERA NETWORKS LTD., Tel Aviv (IL)

( * ) Notice: Subject to any disclaimer, the term of this patent is extended or adjusted under 35 U.S.C. 154(b) by 0 days.

(21) Appl. No.: 17/739,122

(22) Filed: May 8, 2022

(65) Prior Publication Data
US 2022/0261258 A1 Aug. 18, 2022

Related U.S. Application Data

(63) Continuation of application No. PCT/IB2021/060789, filed on Nov. 21, 2021.

(60) Provisional application No. 63/120,806, filed on Dec. 3, 2020.

(51) Int. Cl.
G06F 9/445 (2018.01)
G06F 9/451 (2018.01)
G06F 9/46 (2006.01)
G06F 9/48 (2006.01)

(52) U.S. Cl.
CPC ...... *G06F 9/44521* (2013.01); *G06F 9/44578* (2013.01); *G06F 9/451* (2018.02); *G06F 9/461* (2013.01); *G06F 9/44505* (2013.01); *G06F 9/48* (2013.01); *G06F 2209/545* (2013.01)

(58) Field of Classification Search
None
See application file for complete search history.

(56) References Cited

U.S. PATENT DOCUMENTS 6,807,570 B1 10/2004 Allen et al.
8,140,997 B2 3/2012 Nemoto
8,341,245 B1 12/2012 Roskind et al.
(Continued)

FOREIGN PATENT DOCUMENTS

CN 102063302 A 5/2011
CN 108920156 A 11/2018
(Continued)

OTHER PUBLICATIONS

J. Lee, K. Lee, E. Jeong, J. Jo and N. B. Shroff, "CAS: Context-Aware Background Application Scheduling in Interactive Mobile Systems," in IEEE Journal on Selected Areas in Communications, vol. 35, No. 5, pp. 1013-1029, May 2017, doi: 10.1109/JSAC.2017.2676918. (Year: 2017).*

(Continued)

*Primary Examiner* — Abu Zar Ghaffari
(74) *Attorney, Agent, or Firm* — Kligler & Associates Patent Attorneys Ltd

(57) ABSTRACT

A method includes, in a processor of a user device, deciding to preload a user application, which has one or more User Interface (UI) displays whose state is retained by the processor in a memory of the user device. At least part of the user application is preloaded, and a state of the preloaded user application is restored, in a background mode, to match the retained state of the one or more UI displays.

22 Claims, 2 Drawing Sheets

(56) References Cited

U.S. PATENT DOCUMENTS

| | | | |
|---|---|---|---|
| 8,418,190 B2* | 4/2013 | Rivard | G06F 9/451 718/100 |
| 8,881,033 B2 | 11/2014 | Mentchoukov et al. | |
| 9,385,914 B1* | 7/2016 | Britto | H04L 67/5681 |
| 9,513,888 B1 | 12/2016 | Fultz et al. | |
| 9,565,233 B1 | 2/2017 | Ozuysal et al. | |
| 9,959,506 B1 | 5/2018 | Karppanen | |
| 9,961,159 B2 | 5/2018 | Yellin et al. | |
| 9,979,796 B1 | 5/2018 | Yellin et al. | |
| 10,013,497 B1 | 7/2018 | Boodman | |
| 10,432,748 B2 | 10/2019 | Yellin et al. | |
| 10,459,887 B1 | 10/2019 | Dvortsov et al. | |
| 10,613,735 B1 | 4/2020 | Karpe et al. | |
| 11,095,743 B2 | 8/2021 | Yellin et al. | |
| 11,128,729 B2 | 9/2021 | Yellin et al. | |
| 2003/0101234 A1 | 5/2003 | McBrearty et al. | |
| 2003/0195940 A1 | 10/2003 | Basu et al. | |
| 2003/0220984 A1 | 11/2003 | Jones et al. | |
| 2004/0030882 A1 | 2/2004 | Forman | |
| 2005/0066283 A1 | 3/2005 | Kanamaru | |
| 2005/0132302 A1 | 6/2005 | Cina | |
| 2006/0026636 A1* | 2/2006 | Stark | H04N 7/173 725/38 |
| 2006/0101514 A1 | 5/2006 | Milener et al. | |
| 2008/0307339 A1 | 12/2008 | Boro et al. | |
| 2009/0037393 A1 | 2/2009 | Fredricksen et al. | |
| 2010/0058248 A1 | 3/2010 | Park | |
| 2011/0211813 A1 | 9/2011 | Marks | |
| 2012/0023226 A1 | 1/2012 | Petersen et al. | |
| 2012/0023506 A1* | 1/2012 | Maeckel | G06F 9/485 709/227 |
| 2012/0084343 A1 | 4/2012 | Mir et al. | |
| 2012/0159393 A1 | 6/2012 | Sethi | |
| 2012/0167122 A1 | 6/2012 | Koskimies | |
| 2012/0278432 A1 | 11/2012 | Luna | |
| 2012/0317188 A1 | 12/2012 | Fredricksen et al. | |
| 2012/0324481 A1 | 12/2012 | Xia et al. | |
| 2013/0019159 A1 | 1/2013 | Civelli et al. | |
| 2013/0031204 A1 | 1/2013 | Graham et al. | |
| 2013/0173513 A1 | 7/2013 | Chu et al. | |
| 2013/0185633 A1 | 7/2013 | Bunker et al. | |
| 2013/0263023 A1 | 10/2013 | Goodwin et al. | |
| 2013/0275899 A1 | 10/2013 | Schubert et al. | |
| 2013/0283283 A1 | 10/2013 | Wang et al. | |
| 2014/0053057 A1 | 2/2014 | Reshadi et al. | |
| 2014/0094163 A1 | 4/2014 | Widdowson et al. | |
| 2014/0162793 A1* | 6/2014 | Quan | A63F 13/23 463/43 |
| 2014/0201673 A1 | 7/2014 | Dunn | |
| 2014/0280485 A1 | 9/2014 | A Hummaida et al. | |
| 2014/0372356 A1 | 12/2014 | Bilal et al. | |
| 2014/0373032 A1 | 12/2014 | Merry et al. | |
| 2015/0026415 A1 | 1/2015 | Clausen et al. | |
| 2015/0046519 A1 | 2/2015 | Shukla et al. | |
| 2015/0193395 A1 | 7/2015 | Nicolaou et al. | |
| 2015/0207852 A1* | 7/2015 | Boodman | G06F 16/9577 715/234 |
| 2015/0208205 A1 | 7/2015 | Chan et al. | |
| 2015/0215816 A1 | 7/2015 | Abou-Elkheir et al. | |
| 2015/0281147 A1 | 10/2015 | Wang et al. | |
| 2015/0347615 A1 | 12/2015 | McGushion et al. | |
| 2015/0371142 A1 | 12/2015 | Jain | |
| 2015/0372933 A1 | 12/2015 | Cai et al. | |
| 2016/0057167 A1 | 2/2016 | Bach | |
| 2016/0085583 A1 | 3/2016 | Goodson | |
| 2016/0103608 A1 | 4/2016 | Nukala et al. | |
| 2016/0227464 A1 | 8/2016 | Senarath et al. | |
| 2016/0259656 A1 | 9/2016 | Sumner et al. | |
| 2016/0344679 A1 | 11/2016 | Lane et al. | |
| 2017/0011681 A1 | 1/2017 | Bathiche et al. | |
| 2017/0031869 A1 | 2/2017 | Franczyk et al. | |
| 2017/0046235 A1 | 2/2017 | Straub et al. | |
| 2017/0126833 A1 | 5/2017 | DeLuca et al. | |
| 2017/0278477 A1 | 9/2017 | Jeong et al. | |
| 2017/0293465 A1 | 10/2017 | Kotteri et al. | |
| 2017/0371685 A1* | 12/2017 | Tanaka | G06F 11/1446 |
| 2018/0129537 A1 | 5/2018 | Kurtzman et al. | |
| 2018/0212741 A1 | 7/2018 | Lindoff et al. | |
| 2018/0241837 A1 | 8/2018 | Yellin et al. | |
| 2018/0246862 A1 | 8/2018 | Burkard et al. | |
| 2018/0293087 A1 | 10/2018 | Lee et al. | |
| 2018/0364890 A1 | 12/2018 | Lee et al. | |
| 2019/0065144 A1 | 2/2019 | Sumner et al. | |
| 2019/0087205 A1 | 3/2019 | Guday | |
| 2019/0188012 A1 | 6/2019 | Chen et al. | |
| 2019/0188013 A1 | 6/2019 | Krishna et al. | |
| 2019/0196849 A1 | 6/2019 | Chen et al. | |
| 2019/0205159 A1 | 7/2019 | Wen et al. | |
| 2019/0361581 A1* | 11/2019 | Wang | G06F 3/0484 |
| 2019/0370022 A1* | 12/2019 | Han | G06F 9/52 |
| 2020/0159597 A1 | 5/2020 | Yellin et al. | |
| 2020/0159816 A1 | 5/2020 | Bostrom et al. | |
| 2020/0183822 A1 | 6/2020 | Bates | |
| 2020/0225818 A1 | 7/2020 | Ozuysal | |
| 2020/0336514 A1 | 10/2020 | Momchilov et al. | |
| 2020/0342338 A1* | 10/2020 | Huang | G06F 9/44578 |
| 2020/0401418 A1 | 12/2020 | Regev et al. | |
| 2021/0103447 A1 | 4/2021 | Wei et al. | |
| 2021/0224085 A1* | 7/2021 | Moore | G06F 9/445 |
| 2021/0304096 A1 | 9/2021 | Kirubakaran et al. | |
| 2021/0329088 A1 | 10/2021 | Yellin et al. | |
| 2021/0329089 A1 | 10/2021 | Yellin et al. | |
| 2021/0329090 A1 | 10/2021 | Yellin et al. | |
| 2021/0329091 A1 | 10/2021 | Yellin et al. | |
| 2021/0385295 A1 | 12/2021 | Yellin et al. | |
| 2022/0413695 A1 | 12/2022 | Guan et al. | |

FOREIGN PATENT DOCUMENTS

| | | |
|---|---|---|
| KR | 20160116910 A | 10/2016 |
| WO | 2015169188 A1 | 11/2015 |
| WO | 2018055506 A1 | 3/2018 |
| WO | 2018234967 A1 | 12/2018 |
| WO | 2021019415 A1 | 2/2021 |
| WO | 2019082042 A1 | 5/2021 |
| WO | 2021161174 A1 | 8/2021 |

OTHER PUBLICATIONS

International Application # PCT/IB2022/050581 Search Report dated May 25, 2022.
Peled et al., U.S. Appl. No. 17/567,187, filed Jan. 3, 2022.
Peled et al., U.S. Appl. No. 17/567,183, filed Jan. 3, 2022.
Peled et al., U.S. Appl. No. 17/624,357, filed Jan. 3, 2022.
U.S. Appl. No. 17/363,039 Office Action dated May 11, 2022.
"The Activity Lifecycle," Android Developers, pp. 1-21, last updated Oct. 27, 2021, as downloaded from https://developer.android.com/guide/components/activities/activity-lifecycle.
International Application # PCT/IB2021/060789 Search Report dated Mar. 21, 2022.
International Application # PCT/IB2021/061606 Search Report dated Apr. 7, 2022.
International Application # PCT/IB2021/061606 filed Dec. 13, 2021.
International Application # PCT/IB2022/050581 filed Jan. 24, 2022.
International Application # PCT/IB2022/051531 filed Feb. 22, 2022.
U.S. Appl. No. 17/363,047 Office Action dated Jul. 26, 2022.
International Application # PCT/IB2022/051531 Search Report dated Jun. 19, 2022.
U.S. Appl. No. 17/403,908 Office Action dated Jul. 21, 2022.
U.S. Appl. No. 17/363,047 Office Action dated Nov. 1, 2022.
U.S. Appl. No. 17/567,183 Office Action dated Dec. 30, 2022.
EP Application # 20845959.4 Search Report dated Feb. 2, 2023.
U.S. Appl. No. 17/624,357 Office Action dated Mar. 13, 2023.
U.S. Appl. No. 17/567,187 Office Action dated Mar. 27, 2023.

* cited by examiner

PRELOADING OF APPLICATIONS HAVING AN EXISTING TASK

CROSS-REFERENCE TO RELATED APPLICATIONS

This application is a continuation of PCT application PCT/IB2021/060789, filed Nov. 21, 2021, which claims the benefit of U.S. Provisional Patent Application 63/120,806, filed Dec. 3, 2020. The disclosures of these related applications are incorporated herein by reference.

FIELD OF THE INVENTION

The present invention relates generally to handling of user applications in user devices, and particularly to methods and systems for preloading of applications and content.

BACKGROUND OF THE INVENTION

In applications ("apps") that run on user devices such as smartphones, one of the major factors affecting user experience is the latency of the User Interface (UI). Various techniques have been proposed for reducing latency and providing a more responsive UI. Some techniques involve prefetching of content. Other techniques involve background preloading of apps. Yet other techniques involve pre-rendering of an app's UI. Techniques of this sort are described, for example, in PCT International Publication WO 2018/055506, entitled "An Optimized CDN for the Wireless Last Mile," which is incorporated herein by reference.

PCT International Publication WO 2019/171237, entitled "Application Preloading in the Presence of User Actions," whose disclosure is incorporated herein by reference, describes a method in a processor of a user device. The method includes preloading one or more user applications in a background mode. An activity, which is invoked in the processor and is associated with a given preloaded user application, is detected. An assessment is made by the processor, whether the activity is a preload-initiated activity that is invoked due to preloading of the given user application, or whether the activity is a user-initiated activity that is invoked due to an action by the user. If the activity is assessed to be a preload-initiated activity, the activity is handled using a first handling scheme. If the activity is assessed to be a user-initiated activity, the activity is handled using a second handling scheme, different from the first handling scheme.

SUMMARY OF THE INVENTION

An embodiment of the present invention that is described herein provides a method including, in a processor of a user device, deciding to preload a user application, which has one or more User Interface (UI) displays whose state is retained by the processor in a memory of the user device. At least part of the user application is preloaded, and a state of the preloaded user application is restored, in a background mode, to match the retained state of the one or more UI displays.

In some embodiments, the one or more UI displays are not currently live. In a disclosed embodiment, the state retained in the memory is indicative of the state of the one or more UI displays while the one or more UI displays were live.

In some embodiments, the one or more UI displays are arranged in a stack. In an embodiment, preloading the at least part of the user application includes (i) checking whether a UI display located at a top of the stack is a main UI display of the user application, and (ii) preloading the user application only when the UI display at the top of the stack is the main UI display of the user application. In another embodiment, preloading the at least part of the user application includes preloading only a UI display located at a top of the stack.

In some embodiments, the one or more UI displays include multiple UI displays, and preloading the at least part of the user application includes preloading the multiple UI displays. In an embodiment, preloading the multiple UI displays includes preloading the multiple UI displays in an order that proceeds from a bottom of the stack to a top of the stack. In an alternative embodiment, preloading the multiple UI displays includes preloading the multiple UI displays in an order that proceeds from a top of the stack to a bottom of the stack. In disclosed embodiments, preloading the multiple UI displays includes preloading each of the multiple UI displays individually, and combining the individually-preloaded UI displays to reconstruct the stack.

In some embodiments, the one or more UI displays include one or more Android Activities.

There is additionally provided, in accordance with an embodiment that is described herein, a user device including a display screen and a processor. The display screen is configured to display User-Interface (UI) displays of user applications to a user. The processor is configured to decide to preload a user application, which has one or more User Interface (UI) displays whose state is retained by the processor in a memory of the user device, to preload at least part of the user application, and to restore a state of the preloaded user application, in a background mode, to match the retained state of the one or more UI displays.

The present invention will be more fully understood from the following detailed description of the embodiments thereof, taken together with the drawings in which:

DETAILED DESCRIPTION OF EMBODIMENTS

Definitions

Figure 1:
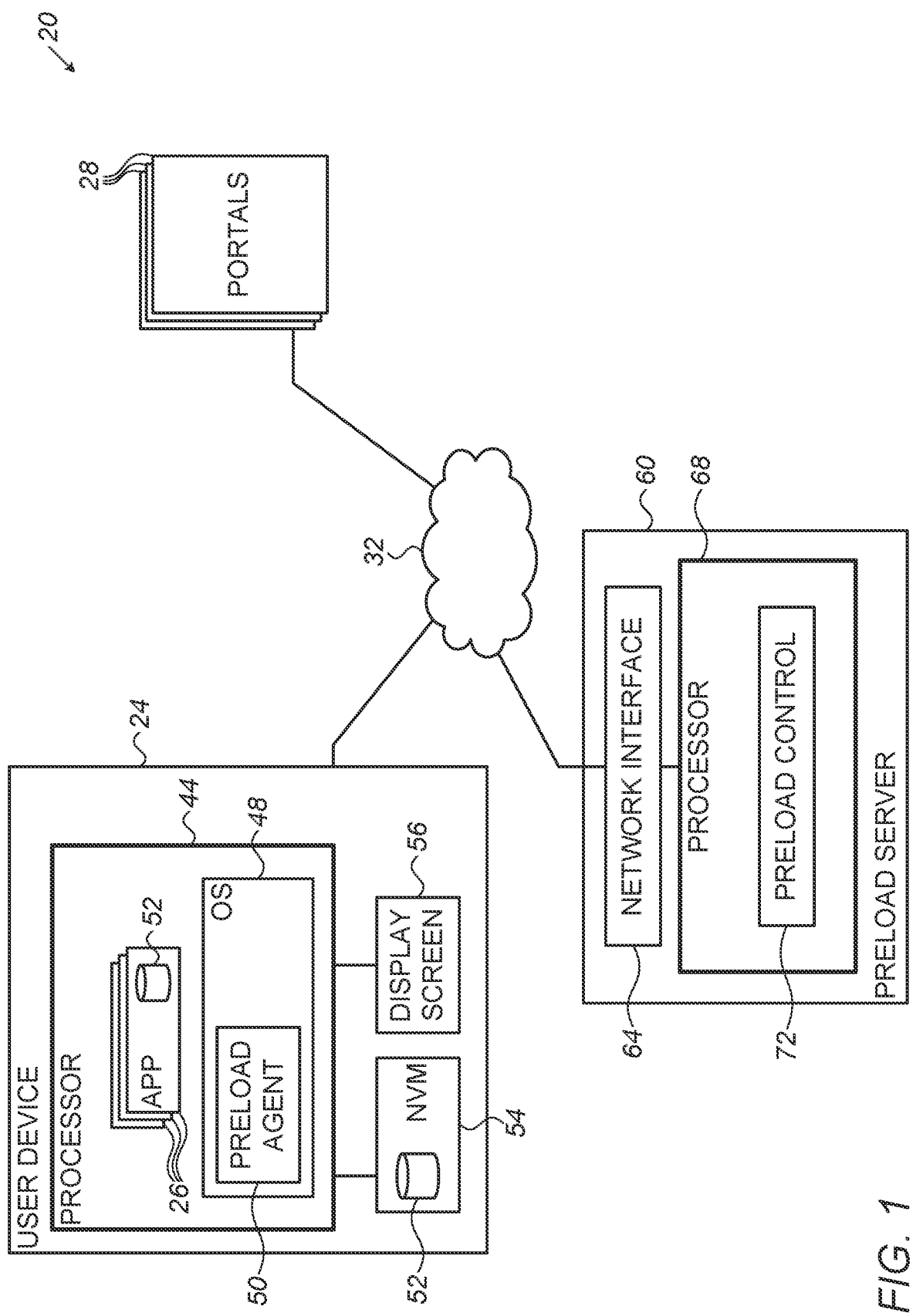
FIG. 1 is a block diagram that schematically illustrates a communication system that employs preloading, in accordance with an embodiment of the present invention.

The present disclosure refers to preloading of applications ("apps") and app components such as User Interface (UI) Displays. In the present context, the term "preloading" refers to the process of loading, launching and at least partially running an app in a background mode unnoticeably to the user, not in response to a request by the user to interact with the app. App components that may be preloaded comprise, for example, the main feed of the app, other UI displays of the app, and/or in-app content, i.e., app content that is not immediately visible to the user upon launching the app. App preloading may involve, for example, pre-rendering of one or more UI displays of the app in the background.

Certain aspects of preloading are addressed in PCT International Publication WO 2021/161174, entitled "Preloading of Applications and In-Application Content in User Devices," filed Feb. 10, 2021, whose disclosure is incorporated herein by reference.

The term "UI display" in this context refers to a logical UI element—A view or a window that is used by the app to enable interaction with the user. In the Android Operating System (OS), for example, UI displays are referred to as "views" or "activities." The description that follows will refer mainly to the Android OS and to activities, by way of example.

Activities are commonly maintained in "tasks". A task typically comprises a container that stores, as a stack, records of activities that users interact with when performing a certain job.

The OS may set activities (or UI displays in general) to various states. For example, a "Live" activity is an activity that exists in memory inside an existing process, typically having a rendered UI ready in memory, and an activity record exists in the system pointing to the activity. As another example, an activity in a "Destroyed" state is an activity that was once live but no longer exists in memory. Rather, there exists only a record of the activity, possibly holding a saved state. When appropriate, the OS can create a new activity, which is similar in structure and in state to the previous live activity.

OVERVIEW

Embodiments of the present invention that are described herein provide improved methods and systems for preloading of apps and app components such as activities. The disclosed techniques address a common scenario, in which the OS of a user device decides to preload an app having an existing task. Consider, for example, the following chain of events:

A user interacts with (e.g., views) one or more activities of a certain app, meaning the app runs in the foreground of the user device.

The user then moves the app to the background, e.g., in order to interact with a different app.

At some point in time, the OS decides to kill the process of the app that is running in the background, for example in order to free memory resources. Although the app process is killed, the OS retains the task (which now comprises records of activities in a "Destroyed" state, typically activities that the user interacted with). In this manner, the state of the activities in question is retained in memory (volatile or non-volatile), enabling the app to resume from the state it was when the user moved it to the background.

At some later time, the OS decides to preload the app, for any reason.

At this point, the user's expectation is that when he or she returns to the app, the app will resume from (at least approximately) the state it was when it was moved to the background. Therefore, the preloading operation should not end with the app in its initial state (the state the app would reach on normal launch), but rather in the state it was when the user moved it to the background. In the present context, the terms "normal launch" and "normal preload" refer to launch and preload operations (accordingly) of an app that does not already have an existing task and/or an existing saved state.

Embodiments of the present invention provide several techniques for preloading an app while complying with the above requirement. Generally speaking, in some embodiments a processor in a user device decides to preload a user application, which already has one or more User Interface (UI) displays whose state is retained by the processor in a memory of the user device. The processor preloads at least part of the user application, and restores the state of the preloaded user application, in a background mode, to match the retained state of the UI displays.

The disclosed techniques thus provide reduced latency due to preloading, and at the same time preserve the user experience expected by the user. In the use-cases described herein, the app process is killed at some point before the decision to preload the app. The disclosed techniques, however, are not limited to such use-cases. For example, the task and activity states may be saved before the user device is powered down. When the user device is later powered up again, the task still exists and there is no app process.

System Description

FIG. 1 is a block diagram that schematically illustrates a communication system 20 that employs preloading, in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a video gaming console, a smart TV, a wearable device, an automotive user device, or any other suitable type of user device that is capable of presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing functions of the user device. Among other functions, processor 44 runs an Operating System (OS) 48, which in turn runs apps 26. The embodiments described herein refer mainly to the Android OS. The disclosed techniques, however, are applicable to any other suitable OS that may run on user devices, e.g., iOS, Windows, Linux and the like. OS 48 comprises a software component referred to as a preload agent 50, which handles preloading of apps. Apps 26, OS 48 and preload agent 50 are drawn schematically inside processor 44, to indicate that they comprise software running on the processor.

In addition, user device 24 comprises a Non-Volatile Memory (NVM) 54, e.g., a Flash memory. NVM 54 may serve, inter alia, for storing a cache memory 52 for caching content associated with apps. In some embodiments the user device uses a single cache 52. In other embodiments, also depicted schematically in the figure, a separate cache memory 52 may be defined per app. Hybrid implementations, in which part of cache 52 is centralized and some is app-specific, are also possible. For clarity, the description that follows will refer simply to "cache 52", meaning any suitable cache configuration.

User device 24 further comprises a display screen 56 for presenting visual content to the user, and a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a preload server 60 that performs preloading-related functions on the network side. Server 60 comprises a network interface 64 for communicating over network 32, and a processor 68 that carries out the various functions of the preload server. In the present example, processor 68 runs a preload control unit 72 that carries out network-side preloading-related functions.

Network-side preloading-related functions may comprise, for example, deciding which apps to preload and when, choosing whether and which in-app content to preload, deciding how much of an app component to preload (e.g., only executing some initial executable code, or pre-rendering of the app's user interface and/or deciding on the duration of foreground simulation). Another possible network-side preloading-related function may comprise, for example, deciding on an applicable preloading mode, e.g., off-line preloading in which access to the network is restricted or forbidden, or on-line preloading in which network access is permitted. Preloading modes are addressed, for example, in PCT Application PCT/IB2020/057046, whose disclosure is incorporated herein by reference. Yet another example is a "whitelist" of apps permitted to undergo preloading, as elaborated below. In an embodiment, preload server 60 may be implemented as a cloud-based application.

In the embodiments described herein, for the sake of clarity, preloading functions are described as being carried out by processor 44 of user device 24. Generally, however, preloading functions may be carried out by processor 44 of device 24, by processor 68 of server 60, or both.

Preloading an app 26 may involve preloading any app element such as executable code associated with the app, e.g., launch code, app feed, app landing page, various UI elements associated with the app, content associated with the app, app data associated with the app, and/or code or content that is reachable using the app by user actions such as clicks ("in-app content"). Pre-rendering of content may involve background processing of any suitable kind of UI display, or a portion thereof. In Android terminology, for example, pre-rendering may comprise background processing of one or more Android Activities. In the background mode, UI elements associated with the app are not presented to the user on display screen 56, i.e., are hidden from the user. When the user invokes a previously-preloaded app, the user device switches to run the app in a foreground mode that is visible to the user. (The terms "background mode" and "foreground mode" are referred to herein simply as "background" and "foreground," for brevity.)

The configurations of system 20 and its various elements shown in FIG. 1 are example configurations, which are chosen purely for the sake of conceptual clarity. In alternative embodiments, any other suitable configurations can be used. For example, in some embodiments the preloading functions may be implemented entirely in processor 44 of user device 24, in which case subsystem 60 may be eliminated altogether.

Preload agent 50 may be implemented in a software module running on processor 44, in an application running on processor 44, in a Software Development Kit (SDK) embedded in an application running on processor 44, as part of the OS running on processor 44 (possibly added to the OS by the user-device vendor or other party), in a proxy server running on processor 44, using a combination of two or more of the above, or in any other suitable manner. In most of the description that follows, preload agent 50 is assumed to be part of OS 48 of user device 24.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, preload agent 50 and/or preloading server 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Preloading an App Having an Existing Task

In some embodiments, preload agent 50 may at some point decide to preload an app 26, which has an existing task that was moved to the background. The task in question may comprise one or more activities. Typically, these activities are in a "destroyed" state, e.g., because the process of the app has been previously killed by OS 48.

The Android OS, for example, typically saves an object referred to as an "instance state," per activity, in the user device Flash memory (e.g., NVM 54). The "instance state" comprises multiple UI-related configuration parameters by default. The app, however, also typically has an opportunity to add state parameters to the "instance state" object when the activity transitions into the "Destroyed" state. If and when the activity is later relaunched, the OS provides the saved "instance state", including the parameters that the app added to it, back to the app. This mechanism allows the app itself to launch the activity into the appropriate state.

Figure 2:
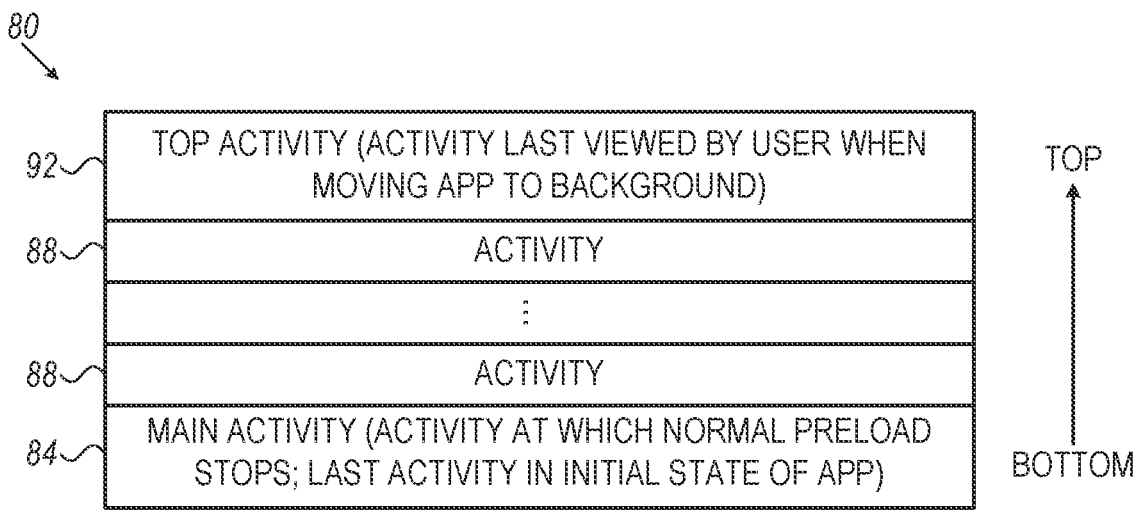
FIG. 2 is a diagram illustrating a task of a user application moved to the background, in accordance with an embodiment of the present invention.

FIG. 2 is a diagram illustrating a task 80 of an app 26 that was moved to the background, in accordance with an embodiment of the present invention. In the present example, task 80 comprises multiple activities arranged in a stack, from bottom to top. The order of the activities in the stack corresponds to the order in which the user interacted with the activities, with the most recent at the top.

As seen in the figure, the activity at the bottom of the task is a main activity 84 of the app. The main activity is the activity in which a normal preloading operation (i.e., preloading of an app that does not have any existing task or saved state) or normal launching of the app would end. In other words, main activity 84 is the last activity in the initial state of the app.

One or more additional activities 88 may exist on top of main activity 84. The activity at the very top of the task is referred to as a top activity 92. The top activity is typically the most recent activity that the user interacted with (e.g., viewed) before moving the app to the background.

The configuration of task 80 shown in FIG. 2 is an example configuration. For example, task 80 may comprise a smaller number of activities. In one example, task 80 may comprise only main activity 84 and top activity 92, or even a single activity (e.g., when the user only viewed the main activity before moving it to the background, meaning the main activity is also the top activity). As another example, task 80 may comprise one or more activities 88 that are below main activity 84. In other words, the main activity is not necessarily the bottom activity in the task.

After task 80 is moved to the background, OS 48 may decide to set one or more activities of task 80 to the "destroyed" state. OS 48 may set an activity to the "destroyed" state, for example, as part of killing the app process or at any other suitable time.

Figure 3:
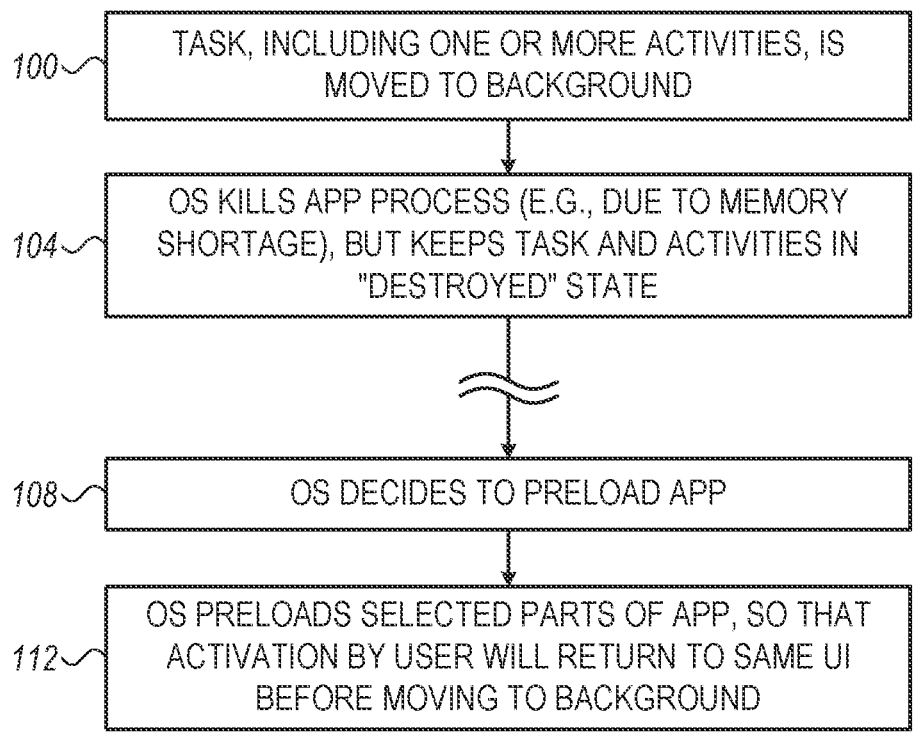
FIG. 3 is a flow chart that schematically illustrates a method for preloading a user application having an existing task, in accordance with an embodiment of the present invention.

FIG. 3 is a flow chart that schematically illustrates a method for preloading an app 26 having an existing task, in accordance with an embodiment of the present invention. The method begins with OS 48 (running on processor 44) moving a task having one or more activities to the background, at a task moving operation 100. The OS may move the task to the background, for example, in response to the user swiping the app off the screen, switching to interact with another app, or performing any other UI action that is interpreted as a request to move the app to the background.

At a process killing operation 104, OS 48 kills the app process of the app in question. The OS may decide to kill the app process, for example, due to memory shortage, in order to free memory resource. The task that the user interacted with, however, is retained by the OS in memory in a "destroyed" state. In the destroyed state, the states of the activities of the task are retained in memory (in an internal memory—RAM—of processor 44 or in NVM 54) and can be restored if desired.

At a later point in time, preload agent 50 in OS 48 decides to preload the app, at a preloading decision operation 108. Agent 50 may decide to preload the app based on any suitable criterion. The decision to preload is also referred to as a "preload trigger." For example, agent 50 may predict that the user is likely to launch the app. Various types of preload triggers are addressed in PCT International Publication WO 2018/055506 ("An Optimized CDN for the Wireless Last Mile") cited above.

At a preloading operation 112, preload agent 50 preloads at least part of the app. In preloading the appropriate part of the app, agent 50 restores the state of the app so as to match the retained state of the existing task. As a result, if and when the user returns to the app, the app will resume from (at least approximately) the state it was in when the task was moved to the background. In particular, the user will see the same constellation of activities he last saw, before moving the app to the background.

In various embodiments, preload agent 50 may use various techniques for restoring the state of the app as expected by the user. In the various examples below, whenever preloading an activity, agent 50 restores the saved state of that activity. Activities that are not preloaded typically remains in the Destroyed state, until the user navigates to them.

In one embodiment, in response to the preload trigger, preload agent 50 preloads the app only if the main activity of the app is located at the top of the existing task. If the main activity (main UI display) is the top activity (UI display at the top of the task), agent 50 preloads the app, otherwise it does not.

In another embodiment, preload agent 50 responds to the preload trigger by preloading only the top activity of the existing task.

In yet another embodiment, preload agent 50 responds to the preload trigger by preloading two or more activities of the existing task (including the top activity), e.g., all the activities of the task.

When preloading multiple activities of the existing task, agent 50 may preload the activities in various orders. In one embodiment agent 50 preloads the activities in an order that proceeds from the bottom of the task to the top of the task. In an alternative embodiment the order proceeds from the top of the task to the bottom of the task.

When preloading multiple activities of the existing task, agent 50 may preload each activity individually, and then combine the individually-preloaded activities so as to reconstruct the task. Preloading each activity individually may be performed, for example, by preloading each activity in a separate temporary task, combining the individually-preloaded activities may be performed, for example, by moving the activities into a single task.

The relative pros and cons of the above embodiments are addressed in U.S. Provisional Patent Application 63/120, 806, cited above. In alternative embodiments, agent 50 may use any other suitable technique for preloading selected parts of the app and restoring the expected state of the existing task.

Although the embodiments described herein address selected example use-cases, the methods and systems described herein can be used in other situations in which an OS needs to preload an app having an existing task and/or one or more existing activities and/or one or more UI saved states.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a processor of a user device, deciding to preload a user application having one or more User Interface (UI) displays, wherein a state of one or more of the UI displays, the state comprising multiple UI-related parameters from a previous usage of the user application by a user, is retained by the processor in a memory of the user device; and using the processor, preloading at least part of the user application in a background mode in which the UI displays are unnoticeable to the user, including launching the user application in the background mode and running the user application in the background mode until the UI-related parameters of the preloaded user application match the retained state of the one or more UI displays.

2. The method according to claim 1, wherein the one or more UI displays are not currently live.

3. The method according to claim 2, wherein the state retained in the memory is indicative of the state of the one or more UI displays while the one or more UI displays were live.

4. The method according to claim 1, wherein the one or more UI displays are arranged in a stack.

5. The method according to claim 4, wherein preloading the at least part of the user application comprises:
   checking whether a UI display located at a top of the stack is a main UI display of the user application at which a normal launch of the user application would be completed; and
   preloading the user application only when the UI display at the top of the stack is the main UI display of the user application.

6. The method according to claim 4, wherein preloading the at least part of the user application comprises preloading only a UI display located at a top of the stack.

7. The method according to claim 4, wherein the one or more UI displays comprise multiple UI displays, and wherein preloading the at least part of the user application comprises preloading the multiple UI displays.

8. The method according to claim 7, wherein preloading the multiple UI displays comprises preloading the multiple UI displays in an order that proceeds from a bottom of the stack to a top of the stack.

9. The method according to claim 7, wherein preloading the multiple UI displays comprises preloading the multiple UI displays in an order that proceeds from a top of the stack to a bottom of the stack.

10. The method according to claim 7, wherein preloading the multiple UI displays comprises preloading each of the multiple UI displays individually, and combining the individually-preloaded UI displays to reconstruct a preloaded version of the stack.

11. The method according to claim 1, wherein the one or more UI displays comprise one or more Android Activities.

12. A user device, comprising:
   a display screen, configured to display User-Interface (UI) displays of user applications to a user; and
   a processor, configured to:
      decide to preload a user application having one or more User Interface (UI) displays, wherein a state of one or more of the UI displays, the state comprising multiple UI-related parameters from a previous usage of the user application by a user, is retained by the processor in a memory of the user device; and
      preload at least part of the user application in a background mode in which the UI displays are unnoticeable to the user, including launching the user application in the background mode and running the user application in the background mode until the UI-related parameters of the preloaded user application match the retained state of the one or more UI displays.

13. The user device according to claim 12, wherein the one or more UI displays are not currently live.

14. The user device according to claim 13, wherein the state retained in the memory is indicative of the state of the one or more UI displays while the one or more UI displays were live.

15. The user device according to claim 12, wherein the one or more UI displays are arranged in a stack.

16. The user device according to claim 15, wherein the processor is configured to:
   check whether a UI display located at a top of the stack is a main UI display of the user application at which a normal launch of the user application would be completed; and
   preload the user application only when the UI display at the top of the stack is the main UI display of the user application.

17. The user device according to claim 15, wherein the processor is configured to preload only a UI display located at a top of the stack.

18. The user device according to claim 15, wherein the one or more UI displays comprise multiple UI displays, and wherein the processor is configured to preload the multiple UI displays.

19. The user device according to claim 18, wherein the processor is configured to preload the multiple UI displays in an order that proceeds from a bottom of the stack to a top of the stack.

20. The user device according to claim 18, wherein the processor is configured to preload the multiple UI displays in an order that proceeds from a top of the stack to a bottom of the stack.

21. The user device according to claim 18, wherein the processor is configured to preload each of the multiple UI displays individually, and to combine the individually-preloaded UI displays to reconstruct a preloaded version of the stack.

22. The user device according to claim 12, wherein the one or more UI displays comprise one or more Android Activities.

* * * * *